J. A. BIEBER.
VEHICLE BODY.
APPLICATION FILED MAR. 5, 1909.
963,854.
Patented July 12, 1910.
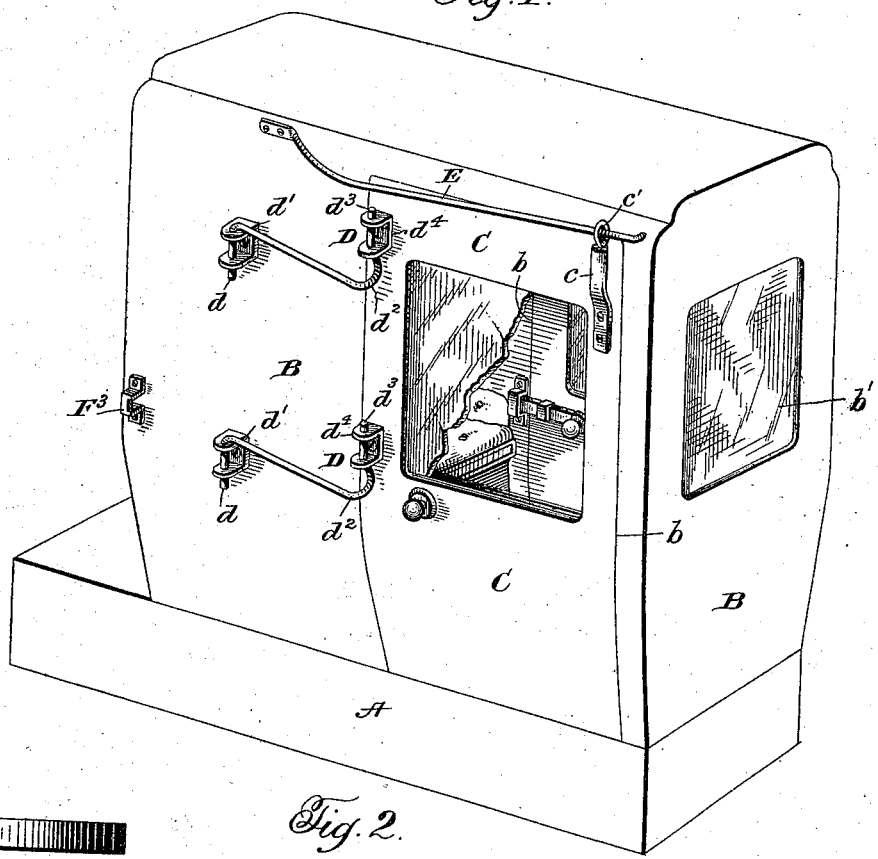
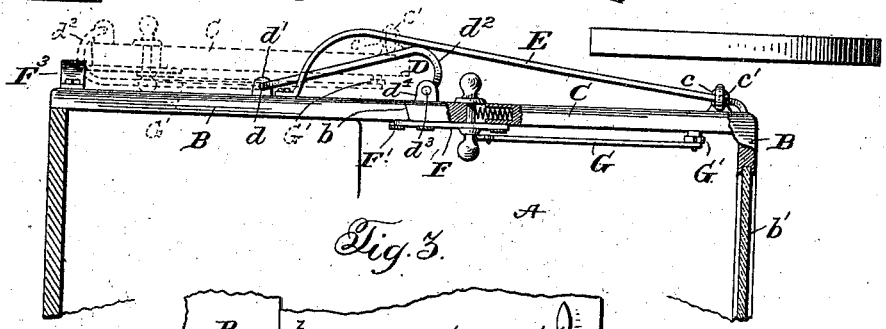
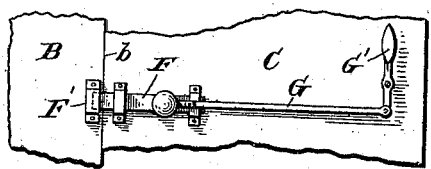
Witnesses:
Jas. E. Hutchinson
Thos. F. C. Heath
Inventor:
James A. Bieber,
By Jas. A. Hunter Attorney.

UNITED STATES PATENT OFFICE.

JAMES A. BIEBER, OF FRANKFORT, INDIANA.

VEHICLE-BODY.

963,854. Specification of Letters Patent. Patented July 12, 1910.

Application filed March 5, 1909. Serial No. 481,268.

*To all whom it may concern:*

Be it known that I, JAMES A. BIEBER, citizen of the United States of America, residing at Frankfort, in the county of Clinton and State of Indiana, have invented certain new and useful Improvements in Vehicle-Bodies, of which the following is a specification, reference being had therein to the accompanying drawing.

This invention relates to an improvement in vehicle bodies and more particularly to a vehicle body which is provided with side doors and a closed front having a window therein, so that in inclement weather the vehicle body may be wholly closed in, but when desired, the doors and windows can be opened to convert the same into an open vehicle body.

The object of the present invention is the provision of a vehicle body of this character which is provided with side doors of such a construction that they may be readily opened and closed without interfering with the wheels of the vehicle and which, when open will lie flat against the vehicle body and out of the way.

A further object of the invention is the provision of improved means for supporting the door during the opening and closing movements thereof and of means for locking the door in both its open and closed positions.

Other objects of the invention will be apparent from the detailed description hereinafter when read in connection with the accompanying drawings forming a part hereof, wherein a preferable embodiment of the invention is shown and wherein like characters of reference refer to similar parts in the several views.

In the drawings Figure 1 is a perspective view of a vehicle embodying my invention. Fig. 2 is a horizontal section through one side of the vehicle with the door in the closed position, the open position of the door being indicated in dotted lines. Fig. 3 is a view looking from the inside of the vehicle showing the door in closed position and locking means for the same.

Referring now more particularly to the drawings, A designates the vehicle bed which is of any well known type and upon which is detachably supported in any desired manner a rigid top B, which is provided with door openings $b$ at the sides thereof, and with a closed front in which is slidably or otherwise movably secured a window $b'$. The door openings $b$ in the sides of the top B of the vehicle are normally closed by doors C which fit snugly therein, said doors being adapted when not in use to be folded rearwardly against the sides of the vehicle top and being so mounted that they may be moved to this position without interfering with the vehicle wheel.

The doors C are identical in construction and but one of them need be described herein in detail. The rear edge of the door C is connected to the top B by means of hinged members D the forward ends of which are pivotally connected to the outside of the door at the rear edge thereof, and the rear ends of which are pivotally connected to the top B at some distance in rear of the door opening $b$ therein. The hinge members D comprise metallic arms the rear ends of which are provided with downwardly turned portions $d$, which are pivotally mounted in sockets $d'$, which are secured to the exterior of the top B of the vehicle and the forward ends of which are provided with inwardly extending loops $d^2$, which terminate in upwardly extending portions $d^3$, which are pivotally mounted in sockets $d^4$ secured to the exterior of the door C adjacent the rear edge thereof. The loops $d^2$ of the hinge members D permit the door to be swung inwardly a sufficient distance to closely fit the door opening $b$ and also prevent the rear edge of the door from contacting with the hinge members D during the rearward movement of the door, so that the door may be shifted to a position to lie flat against the side of the top. Rigidly secured to the exterior of the top B of the vehicle just above the door opening $b$ in the side thereof, and extending completely across said door opening and in rear thereof is a guide rail E. The guide rail E comprises a metal bar, the ends of which are bent inwardly for a short distance and then secured to the body of the vehicle. Secured to the top of the door C adjacent the forward edge thereof is a door hanger $c$, which terminates at its upper end in a loop $c'$ which loosely engages the guide rail E, heretofore referred to, said door hanger serving to support the forward end of the door during the movement thereof. The loop $c'$ is made sufficiently large to accommodate for the slight angular movement of the door as it is moved to and from its closed position.

The door C is locked in its closed position by means of an ordinary spring latch F, which is mounted in the rear edge thereof and engages a suitable keeper F′ secured to the interior of the top B adjacent the rear edge of the door opening therein. The latch F is adapted to be actuated by an actuating shaft of any well known construction, which carries knobs positioned on both the exterior and interior of the door. To hold the door in its open position a keeper $F^3$ is secured to the exterior of the top B of the vehicle, which keeper is adapted to be engaged by the latch F when the door is swung against the side of the vehicle top. To permit the release of the latch F from the keeper $F^3$ by an occupant of the vehicle, a rod G is pivotally connected at its rear end to an offset portion on the actuating shaft of the latch, said rod extending along the inner surface of the door and having its forward end pivotally connected to one end of a lever G′, which is pivoted to the inner surface of the door C adjacent the forward edge thereof, the other end of said lever being provided with a suitable operating handle or button. From this construction it will be seen that when the door is shifted to its open position, the lever G′ will be moved into proximity to the vehicle seat, so that the occupant thereof can readily disengage the latch F from its keeper $F^3$ and move the door to its closed position.

While a convenient embodiment of the invention is illustrated in the accompanying drawings, it will be appreciated that many changes may be made to the form and construction therein shown without departing from the spirit of the invention as defined in the appended claims.

I claim—

1. A vehicle body provided with a door opening therein, a door closely fitting said opening, an arm pivotally connected at its rear end to the exterior of the vehicle body and provided at its forward end with an inturned loop pivotally connected to the exterior of the door adjacent the rear edge thereof.

2. A vehicle body provided with a door opening therein, a single door closely fitting said opening and adapted to open to a position flat against the body, an arm pivotally connected at its rear end to the exterior of the vehicle body and provided at its forward end with an inwardly turned portion pivotally connected to the exterior of the door adjacent the rear edge thereof, and means for supporting and guiding said door during movement thereof.

3. A vehicle body provided with a door opening in the side thereof, a door closely fitting said opening, an arm pivotally connected at its rear end to the outer surface of the vehicle body and provided at its forward end with an inwardly turned portion pivotally connected to the outer surface of the door adjacent the rear edge thereof, a guide rail secured to the vehicle body above the door opening therein, and a door hanger secured to the upper edge of said door adjacent the forward edge thereof and loosely engaging said guide rail.

4. A vehicle body provided with a door opening therein, a door closely fitting said door opening and adapted to open to a position flat against the body, an arm pivotally connected at one end to the door and at its other end to the vehicle body, a sliding connection between the door and vehicle body, a latch carried by the door, and keepers carried by the vehicle body coöperating with said latch to hold the door in either an open or closed position.

5. A vehicle body provided with a door opening in the side thereof, a door closely fitting said opening, an arm pivotally connected at its rear end to the outer surface of the vehicle body and provided at its forward end with an inwardly turned portion pivotally connected to the outer surface of the door adjacent the rear edge thereof, a latch carried by the door, and keepers carried by the vehicle body coöperating with said latch to hold the door in either open or closed position.

6. A vehicle body provided with a door opening therein, a door closely fitting said opening, means for supporting said door whereby it may be swung rearwardly to lie flat against the vehicle body, a latch positioned adjacent the rear edge of the door, keepers carried by the vehicle body coöperating with said latch to hold said door in either its open or closed position, and operating means for said latch adjacent the front and rear edges of the door.

In testimony whereof I affix my signature in presence of two witnesses.

JAMES A. BIEBER.

Witnesses:
JOSHUA H. HAYWARD,
GRANT MERRITT.